Dec. 18, 1956     M. L. SWEENEY, JR     2,774,379

DUAL VALVE FOR CONTROLLING LIQUID LEVEL

Filed May 24, 1950

INVENTOR.
Morgan L. Sweeney, Jr.
BY John N. Wolfram
Agent

United States Patent Office 2,774,379
Patented Dec. 18, 1956

2,774,379

DUAL VALVE FOR CONTROLLING LIQUID LEVEL

Morgan L. Sweeney, Jr., Los Angeles, Calif., assignor to The Parker Appliance Company, Cleveland, Ohio, a corporation of Ohio Application May 24, 1950, Serial No. 163,919

8 Claims. (Cl. 137—637)

This invention relates to valves for controlling the level to which a tank may be filled and which are operable to automatically shut off when the liquid in the tank reaches a predetermined level. The invention is more specifically directed to a main valve unit which includes two fluid pressure operated valves which serially control the flow of fluid under pressure from a filling nozzle to the interior of the tank. Each of the fluid pressure valves is controlled by separate float operated pilot valves and act independently of one another whereby if one of the fluid pressure valves fails to close, the flow of fluid into the tank will be cut off by the other. This provides a safeguard to prevent overfilling and bursting of the tank.

The main valve unit of the present invention, which comprises the housing and arrangement for the fluid pressure operated valves, is an improvement on the similar type of unit described and claimed in my copending application Serial No. 144,249, filed February 15, 1950, now Patent No. 2,619,108, November 25, 1952.

The main valve unit is preferably mounted at the bottom of the tank, although it may be mounted on the side or top wall. The float operated pilot valves are mounted at the top of the tank and connected to the fluid pressure valves by suitable tubing lines. The pilot valves are actuated by floats which operate to close the pilot valves when the tank is filled to a predetermined level and which permit opening of the pilot valves by gravity when the liquid level has been reduced. Both floats may be adjusted to operate at the same liquid level, or if preferred, they may be adjusted to operate at slightly different levels whereby one of the fluid pressure valves will be closed before the other.

It is an object of the invention to provide a multiple fluid pressure valve unit of the type described in which the fluid pressure valves are mounted in axial alignment in the center of the flow path through the housing in such a manner that the incoming fluid is required to change its direction of flow a minimum number of times in passing around both valve elements whereby to minimize turbulence and pressure drop through the valve housing.

It is another object to provide a main valve unit comprising a multiple of fluid pressure operated valves serially in control of the flow of fluid through the unit wherein a pressure chamber is provided for each of the fluid pressure operated valves and wherein such chambers are back-to-back and separated by a common wall.

It is another object to provide a multiple fluid pressure operated valve unit in which the fluid pressure valves are mounted in the central portion of the valve chamber and in which the flow of fluid through the chamber is confined along the outer peripheral wall thereof throughout the entire extent of the valve chamber.

It is another object to provide a multiple fluid pressure operated valve unit of the type directed in which the size and weight is kept to a minimum for a given flow capacity through the unit so as to make the unit more acceptable for aircraft installation.

Other objects will become more apparent from a detailed description and from the drawings in which.

Figure 1:
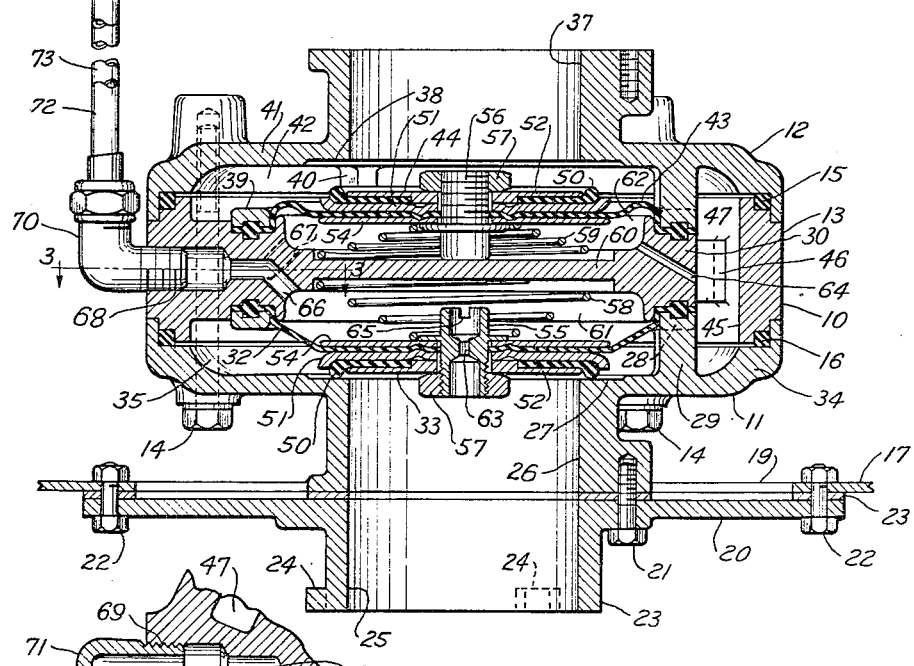
Figure 1 is a longitudinal sectional view of the main valve unit comprising the fluid pressure operated valves with part of the section taken along the line 1—1 of Figure 3.

The main valve unit of Figure 1 includes a housing or casing generally designated at 10 and comprising an inlet section 11, an outlet section 12, and an intermediate section 13. The housing sections are held together by bolts 14 and are sealed at their joints by packings 15 and 16.

In the drawings the main valve 10 is illustrated as being mounted within the interior of a tank whose bottom wall is indicated at 17 and whose top wall is indicated at 18. The housing 10 is inserted through an opening 19 in the bottom wall of the tank and is attached to a tank inlet fitting 20 by bolts 21. The tank inlet fitting closes the tank opening 19 and is secured to the bottom wall 17 of the tank by bolts 22 and sealed thereagainst by a gasket 23. The tank inlet fitting 20 has an extension 23 having bayonet lugs 24 formed thereupon by means of which any suitable filling nozzle, not shown, may be attached thereto.

The tank inlet fitting has an inlet opening 25. The housing section 11 has an inlet port 26 in alignment with the opening 25 and has a valve seat 27 surrounding the inlet port. It also has an annular ring 28 spaced from the valve seat 27 and supported by a plurality of ribs 29. Clamped against the annular ring 28 by a central portion 30 of the intermediate housing section 13 is a flexible diaphragm 32 to which is attached a fluid pressure operated valve generally designated at 33. The annular ring 28 is spaced from the wall portion 34 of the inlet housing section 11 so as to form a flow passage 25 therebetween.

The outlet section 12 is formed similar to the inlet section and has an outlet port 37 leading to the interior of the tank. The outlet is surrounded by a valve seat 38. Spaced from the valve seat is an annular ring 39 supported by and integrally connected to the outlet housing section 12 by spaced ribs 40. The annular ring 39 is spaced from the outer wall 41 of the housing section so as to form the flow passage 42 therebetween.

Clamped against the annular ring 39 by the central portion 30 of the intermediate housing section 13 is a diaphragm 43 to which is attached a second fluid pressure operated valve generally designated as 44.

The central portion 30 of the intermediate housing section 13 is spaced from the outer wall 45 of the latter but integrally connected thereto by means of spaced ribs 46. The space 47 between the annular portion 30 and the outer wall 45 constitutes a flow passage for connecting the passage 35 of the inlet housing section with the passage 42 of the outlet housing section.

The fluid pressure valve 33 is similar in construction with that of valve 44 and like numbers are used to designate the component parts. Each valve has a sealing ring 50 adapted to sealingly contact the respective valve seats 27 and 38. The sealing rings 50 are attached to valve plates 51 by means of clamp plates 52. The valve plates 51 are attached to the respective diaphragms 32 and 43 by means of the backup plates 54 and the threaded studs 55 and 56 and secured by the nuts 57.

The central portion 30 of the intermediate housing section 13 includes a solid transverse wall 60. This wall 60 forms with the valve 33 and diaphragm 32 a pressure chamber 61 and with the valve 44 and diaphragm 43 a pressure chamber 62. Springs 58 and 59 respectively located in the pressure chambers 61 and 62 bear against opposite sides of the wall 60 and against the valves 33 and 44 to normally urge the latter toward their closed positions.

A restricted passage 63 through the stud 55 permits fluid from the inlet port 26 to have access to the pressure chamber 61. Similarly, a restricted passage 64 through the central portion 30 of the intermediate housing section permits access of fluid from the flow passage 47 to have access to the pressure chamber 62. A cross slot 65 in the stud 55 prevents the fluid passing through the restricted passage 63 from being shut off from the pressure chamber 61 when the valve 33 is open and the stud 55 is in contact with the wall 60.

Figure 3:
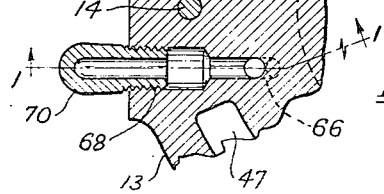
Figure 3 is a fragmentary sectional view taken along the line 3—3 of Figure 1.

Fluid from the pressure chambers 61 and 62 may be discharged therefrom through the bypass ducts 66 and 67 formed in the central portion 30 of the intermediate housing section. Duct 66 leads to a port 68 and duct 67 leads to a port 69 (see Fig. 3), both formed in the intermediate section 13.

Mounted in the ports 68 and 69 are suitable fittings 70 and 71 to which bypass tubing lines 72 and 73 are connected. These tubing lines lead to the upper side of the tank where a pair of float operated pilot valves are mounted. Tubing line 72 connects to pilot valve 74 and tubing line 73 connects to pilot valve 75. These valves are formed with non-circular portions 76 and 77 and mounted in cylindrical valve bores 78 and 79 so that fluid from the tubing lines 72 and 73 may freely pass into the tank when the pilot valves are in the open position with respect to the valve seats 80 and 81.

Figure 2:
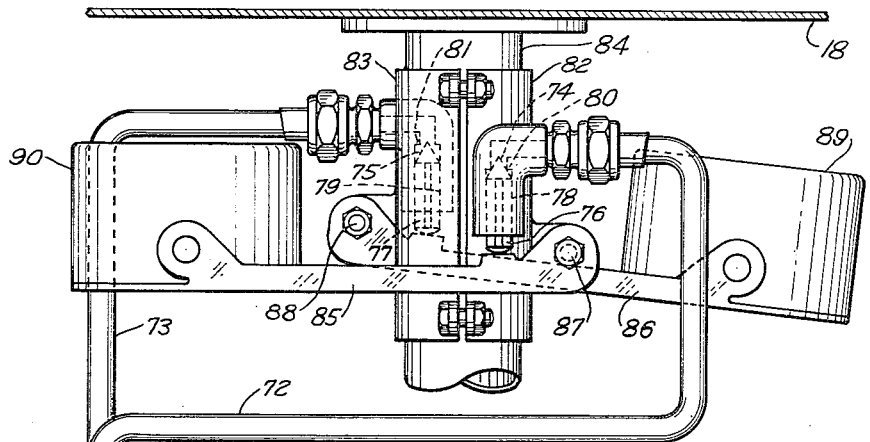
Figure 2 is a side view of a pair of float operated pilot valves for controlling the fluid pressure operated valves of Figure 1.

The pilot valves 75 are carried by split housing sections 82 and 83 which are adjustably mounted on a pipe bracket 84. The lower ends of the pilot valves 74 and 75 are respectively engageable by float arms 85 and 86 which are pivotably mounted at 87 and 88 and which carry floats 89 and 90. As illustrated in Figure 2, the mounting pin 87 for the float 90 is positioned slightly lower than the pin 88 for the float 89. This causes the float 90 to be operated at a slightly lower liquid level than float 89 and results in the closing of the main valve 33 before the closing of valve 44. This is preferred since if the positions of the floats were reversed so that pilot valve 75 and valve 44 would close first, pilot valve 74 would remain open and fluid pressure within the inlet port 26 would continue to be bypassed into the tank at a restricted rate through the passages 63, 66, tube 72, and pilot valve 74.

When the liquid in the tank is lower than a predetermined level, the floats 89 and 90 will be in their lowermost position due to the action of gravity and the pilot valves 74 and 75 will likewise be open due to gravity. The main fluid pressure operated valves 33 and 44 will be in their closed position against the seats 27 and 38 due to the action of the springs 58 and 59.

When it is desired to fill the tank, a suitable supply nozzle is connected to the inlet fitting 20 by means of the bayonet lugs 24. Pressure of incoming fluid from the nozzle will first open valve 33 and pass into the passages 35, 47, and 42, and then operate on the diaphragm 43 to open the valve 44 against the action of the spring 59. The fluid then passes through the outlet port 37 to the interior of the tank. Meanwhile, fluid from the inlet port 26 passes through the restricted passage 63 into the pressure chamber 61 and from the passage 47 through the restricted passage 64 to the pressure chamber 62. However, the bypass ducts 66 and 67 and the passages through the tubes 72 and 73 and the pilot valves 74 and 75 are of larger capacity than the restricted passages 63 and 64 so that fluid may discharge from the pressure chambers 61 and 62 faster than it may enter. Thus fluid pressure is prevented from being built up in the pressure chambers as long as the bypass passages are open and the valves 33 and 44 are maintained in their open position by the pressure of the fluid passing through the main valve housing 10.

When the fluid in the tank has risen to a predetermined level the float 90 will be raised to its uppermost position as illustrated in Figure 2 and close the pilot valve 74. This cuts off the bypassing of fluid from the pressure chamber 61 and permits the pressure of the fluid to build up on the upper side of the valve 33 and force it to a closed position against the seat 27 and thus cut off further flow of fluid into the tank. When this occurs, the pressure of the fluid within the passage 42 acting on the diaphragm 43 drops so as to permit the spring 59 to close the valve 44.

If for any reason the lowermost pilot valve 74 should fail to close or if the main valve 33 should fail to close when the liquid in the tank has reached the predetermined level for operating the float 90 to close the pilot valve 74, raising of the level of the liquid in the tank a slightly greater amount will cause the float 89 to rise and shut off pilot valve 75. This cuts off bypass flow from pressure chamber 62 and permits the building up of pressure in the chamber for closing valve 44.

It will be noted that when the fluid pressure valves 33 and 44 are open, the fluid entering through the inlet port 26 changes its direction of flow as it passes over the valve seat 27 and is directed outwardly along the passage 35 and again changes its direction of flow to pass through the passage 45 of the intermediate housing section. It then changes direction to enter the passage 42 to pass by the valve seat 38 to enter the outlet port 37. Thus in flowing around both of the valves 33 and 44 the flow is directed outwardly only once and inwardly only once, thus minimizing the number of times in which the direction of flow is changed and hence also minimizing the drop in pressure as the fluid passes through the main valve unit.

The pressure chambers 61 and 62 are separated by the common wall 60 and move in opposite directions therefrom when moving toward closed position. This results in a very compact arrangement and materially reduces the size and weight of the unit.

I claim:

1. A fluid flow control device comprising a casing having a main passage therethrough, a pair of fluid pressure operated valves within said casing and serially controlling the flow of fluid through said passage, said valves having areas exposed to the pressure of fluid within the main passage for opening the same, a pressure chamber associated with each of said valves, a bypass duct leading from each of said pressure chambers, other ducts for conducting fluid from said passage to said pressure chambers and a common wall in said casing separating said pressure chambers, said valves also having areas exposed to the pressure of fluid within the respective pressure chamber for closing the valves.

2. A fluid flow control device comprising a casing having a main fluid passage therethrough, said passage including a valve chamber and inlet and outlet ports at opposite sides of said valve chamber, said ports being in axial alignment with each other, a pair of oppositely acting fluid pressure operated inlet and outlet valves within said chamber, the inlet valve controlling the flow of fluid from the inlet port to the valve chamber and the outlet valve controlling the flow of fluid from the valve chamber to the outlet port, a pressure chamber associated with each of said valves, a bypass duct leading from each pressure chamber, and other ducts for conducting fluid from said passage to each of said pressure chambers the inlet valve having an area exposed to fluid in the inlet port for opening the inlet valve when the pressure of fluid in the inlet is greater than the pressure of fluid in the respective pressure chamber, the outlet valve having an area exposed to fluid in the valve chamber for opening the outlet valve when the pressure of the fluid in the valve chamber is greater than the pressure of fluid in the respective pressure chamber.

3. A fluid flow control device comprising a casing having a main fluid passage therethrough, said passage including a valve chamber and inlet and outlet ports at opposite sides of said valve chamber, a transverse wall extending across the valve chamber, openings adjacent the outer diameter of said wall to permit the passage of fluid from one side to the other of said wall, a fluid pressure operated inlet and outlet valve attached to each side of the wall and spaced therefrom to provide a pressure chamber between each fluid pressure valve and the wall, the inlet valve controlling the inlet port and the outlet valve controlling the outlet port, a duct connecting the inlet port to the pressure chamber of the inlet valve, another duct connecting the valve chamber with the pressure chamber of the outlet valve, and bypass ducts leading from the pressure chambers through said wall to the exterior of the casing.

4. A fluid flow control device comprising a casing having a main fluid passage therethrough, said passage including a valve chamber and inlet and outlet ports at opposite sides of said valve chamber, a transverse wall extending across the valve chamber, openings adjacent the outer diameter of said wall to permit the passage of fluid from one side to the other of said wall, a fluid pressure operated inlet and outlet valve attached to each side of the wall and spaced therefrom to provide a pressure chamber between each fluid pressure valve and the wall, the inlet valve controlling the inlet port and the outlet valve controlling the outlet port, a duct through the inlet valve connecting the respective pressure chamber with the inlet port, a duct in the transverse wall connecting the valve chamber with the pressure chamber of the outlet valve and bypass ducts leading from the pressure chambers through the wall to the exterior of the casing.

5. A flow control device comprising a casing having a main fluid passage therethrough, said passage including a valve chamber and inlet and outlet ports on opposite sides of said valve chamber, said casing including two end sections and a center section therebetween, said center section providing a wall extending across the valve chamber, openings adjacent the outer diameter of said wall to permit the passage of fluid from one side to the other of said wall, annular sealing surfaces on the inlet and outlet sides of said wall, each end section having an annular ring axially spaced from the respective port, a diaphragm clamped between the annular ring of each end section and the respective annular sealing surface, inlet and outlet fluid pressure valves carried by the diaphragms, each valve forming with the respective diaphragm and said wall a pressure chamber, the inlet valve controlling the inlet port and the outlet valve controlling the outlet port, a duct connecting the inlet port to the pressure chamber of the inlet valve, another duct connecting the valve chamber with the pressure chamber of the outlet valve, and bypass ducts leading from the pressure chambers through said wall to the exterior of the casing.

6. A flow control device comprising a casing having a main fluid passage therethrough, said passage including a valve chamber and inlet and outlet ports on opposite sides of said valve chamber, said casing including two end sections and a center section therebetween, said center section comprising a wall extending across the valve chamber and an outer annulus attached to the wall by spaced ribs, annular sealing surfaces on the inlet and outlet sides of said wall, each end section having an annular ring axially spaced from the respective port, a diaphragm clamped between the annular ring of each end section and the respective annular sealing surface, inlet and out-
let fluid pressure valves carried by the diaphragms, each valve forming with the respective diaphragm and said wall a pressure chamber, the inlet valve controlling the inlet port and the outlet valve controlling the outlet port, a duct connecting the inlet port to the pressure chamber of the inlet valve, a duct in said wall connecting the valve chamber to the pressure chamber of the outlet valve, bypass ducts leading from the pressure chambers through the wall, to the exterior of the casing, said annulus having a sealed connection to each of the end sections.

7. A flow control device comprising a casing having a main fluid passage therethrough, said passage including a valve chamber and inlet and outlet ports on opposite sides of said valve chamber, said casing including two end sections and a center section therebetween, said center section comprising a wall extending across the valve chamber and an outer annulus attached to the wall by spaced ribs, a recess on each of the inlet and outlet sides of the wall, each recess being surrounded by an annular sealing surface, each end section having an annular ring axially spaced from the respective port, a diaphragm clamped between the annular ring of each end section and the respective sealing annular surface, inlet and outlet fluid pressure valves carried by the diaphragms, each valve with the respective diaphragm closing the respective recess to form a pressure chamber, the inlet valve controlling the inlet port and the outlet valve controlling the outlet port, a duct through the inlet valve connecting the inlet port to the pressure chamber of the inlet valve, a duct in the wall connecting the valve chamber to the pressure chamber of the outlet valve, bypass ducts leading from the pressure chambers through the wall, ribs, and annulus to the exterior of the valve casing, said annulus having a sealed connection to each of the end sections, and bolts located exteriorly of said last mentioned sealed connection clamping the sections together.

8. A fluid flow control device comprising a casing having a main fluid passage therethrough, said passage including a valve chamber and inlet and outlet ports at opposite sides of said valve chamber, said ports being in axial alignment with each other, a pair of oppositely acting fluid pressure operated inlet and outlet valves within said chamber, the inlet valve controlling the flow of fluid from the inlet port to the valve chamber and the outlet valve controlling the flow of fluid from the valve chamber to the outlet port, a pressure chamber associated with each of said valves, a bypass duct leading from each pressure chamber and other ducts for conducting fluid from said passage to each of said pressure chambers the inlet valve having an area exposed to fluid in the inlet port for opening the inlet valve when the pressure of fluid in the inlet is greater than the pressure of fluid in the respective pressure chamber, the outlet valve having an area exposed to fluid in the valve chamber for opening the outlet valve when the pressure of the fluid in the valve chamber is greater than the pressure of fluid in the respective pressure chamber, and a pilot valve associated with each bypass duct for controlling discharge of fluid from the pressure chambers.

References Cited in the file of this patent

UNITED STATES PATENTS

| | | |
|---|---|---|
| 269,886 | Semple | Jan. 2, 1883 |
| 1,302,538 | Gulick | May 6, 1919 |
| 1,676,084 | Flagg | July 3, 1928 |
| 1,988,026 | Unger et al. | Jan. 15, 1935 |
| 2,071,969 | Fiescher | Feb. 23, 1937 |
| 2,085,893 | Boland | July 6, 1937 |